United States Patent [19]

Rambauske

[11] 3,802,767

[45] Apr. 9, 1974

[54] CATOPTRIC LENS ARRANGEMENT

[75] Inventor: Werner R. Rambauske, Carlisle, Mass.

[73] Assignee: Raytheon Company, Lexington, Mass.

[22] Filed: July 3, 1972

[21] Appl. No.: 268,269

[52] U.S. Cl................ 350/294, 350/199, 350/293, 350/299
[51] Int. Cl.............................................. G02b 5/10
[58] Field of Search...... 350/27, 199, 174, 293–295, 350/288, 299, 235–239, 297

[56] References Cited
UNITED STATES PATENTS

| | | | |
|---|---|---|---|
| 3,453,425 | 7/1969 | Whitaker | 350/294 |
| 3,107,296 | 10/1963 | Hine | 350/174 |
| 2,198,014 | 4/1940 | Ott | 350/199 |
| 3,455,623 | 7/1969 | Harris | 350/27 |
| 3,367,607 | 2/1968 | Bowen | 350/294 |

Primary Examiner—Ronald L. Wibert
Assistant Examiner—Michael J. Tokar
Attorney, Agent, or Firm—Philip J. McFarland; Joseph D. Pannone

[57] ABSTRACT

Catoptric lens arrangements for combining energy from a number of sources (as the optical energy in beams from a plurality of lasers) into a single collimated beam are shown. The disclosed lens arrangements are characterized by the fact that at least some of the lens elements possess image points spaced from the lens axis of the lens arrangement, such image points being common to at least two of the lens elements.

4 Claims, 3 Drawing Figures

CATOPTRIC LENS ARRANGEMENT

BACKGROUND OF THE INVENTION

This invention pertains generally to catoptric lens arrangements and particularly to such types of arrangements having lens elements with focal points spaced from the lens axis.

It is now known in the art that so-called "confocal" catoptric lens arrangements, i.e., arrangements incorporating reflecting surfaces corresponding to the curved surface generated by nutating selected quadratic conic sections about a lens axis, combine many desirable qualities. Reflecting surfaces so generated characteristically possess image points on a circle, or an arc of a circle, centered on an axis rather than a single point as in the usual case. Thus, by judiciously selecting particular conic sections for the generatrices of the reflecting surfaces of the elements of a catoptric lens arrangement, it is possible to design such an arrangement to be diffraction-limited with an extremely large aperture. It follows, then, that the $f$-number of such a lens arrangement may be far less than 1. Such a characteristic, in turn, means that radiant energy from a point source may, if desired, be focused within a very small circle of confusion; as a matter of fact, focusing may take place within a circle of confusion with a diameter in the same order as the wavelength of radiant energy. Alternatively, if desired, an almost perfectly collimated beam of radiant energy may be formed from radiant energy from a point source, because the diffraction effects suffered by such a catoptric lens arrangement are very small.

It is evident that confocal catoptric lens arrangements are particularly well suited for applications in which conventional refractive lens arrangements are, for one reason or another, not satisfactory. For example, when the radiant energy to be focused or collimated is concentrated in an intense beam, as in the beam from a high-powered laser, a sufficient amount of such energy incident on a refractive lens arrangement is absorbed by the material from which the lens elements are fabricated (some type of glass, mica or other solid material ordinarily deemed to be totally transparent) thereby causing undue heating which distorts, or even destroys, the lens elements.

Although a catoptric lens arrangement is not as susceptible to damage from overheating because energy passing through such an arrangement is almost completely reflected by the mirror surfaces of the lens elements, there is, however, a slight amount of energy absorbed by each lens element to cause heating. Therefore, especially when it is necessary to combine beams from more than a single high powered laser, even catoptric lens arrangements may be unduly heated. There simply is no known way of making the reflecting surface of lens elements in a catoptric lens arrangement to provide reflecting surfaces which are certain to withstand the enormous concentrations of energy resulting from the use of several high power lasers. Further, with any catoptric lens arrangement not using confocality principles, appreciable aperture blockage must be tolerated in order to arrange the lens elements in proper relative position with respect to each other.

It has been proposed to carry out thermal nuclear fusion by combining the beams from a number of high powered lasers in such a manner that the energy in each beam is focused on a small target. It is possible in such a system to obtain a flux density at the target which is sufficiently high to initiate the fusion reaction. That is, a flux density in the order of $10^{14}$ to $10^{16}$ watts per square centimeter may be attained. When energy with a flux density of such intensity is attained, a concomitant light pressure (in the order of the pressure required to contain the expanding plasma resulting from a nuclear reaction) is generated. Obviously, however, successful containment of an expanding plasma from a real specimen undergoing fusion requires that the light pressure be applied over a continuous finite area. In other words, any lens arrangement suited to the purpose must be capable of forming an "optical bottle."

In the design of optical radars it would be highly desirable to combine beams from several lasers into a composite beam, thereby to increase the effective range of the system. Again, in such an application conventional lens arrangements are inadequate for the basic reason that it is almost impossible to collimate energy from more than one source into a single beam. Using conventional lens elements, which have their focal points on a lens axis, in practice only one laser beam may be collimated by any particular known lens arrangement.

SUMMARY OF THE INVENTION

With the foregoing background of this invention in mind, it is a primary object of this invention to provide a catoptric lens arrangement adapted to produce, from a plurality of laser beams, a single collimated beam.

The primary object and other objects of this invention are attained in a preferred embodiment generally by providing a confocal lens arrangement comprising: (a) a primary, or entrance, lens element with a convex reflecting surface formed from a portion of a generating ellipse, such portion being rotated about a lens axis (such rotation corresponding to nutating the generating ellipse so that the first of its focal points is on the lens axis and the second of its focal points describes a focal circle orthogonal to such axis); and (b) an exit mirror doublet made up of a convex reflecting element confocal with the focal circle of the entrance mirror and a concave reflecting element confocal with the convex reflecting element. The convex reflecting element has a surface corresponding to the surface generated by nutating a hyperbola about the lens axis and the concave reflecting element has a surface corresponding to the surface generated by nutating a parabola about the lens axis, the focal point of the latter being confocal with a focal point of the former along the circumference of a common circle.

BRIEF DESCRIPTION OF THE DRAWINGS

For a more complete understanding of the concepts of this invention, reference is now made to the accompanying description of embodiments illustrated in the drawings, in which.

DESCRIPTION OF THE PREFERRED EMBODIMENTS

Figure 1:
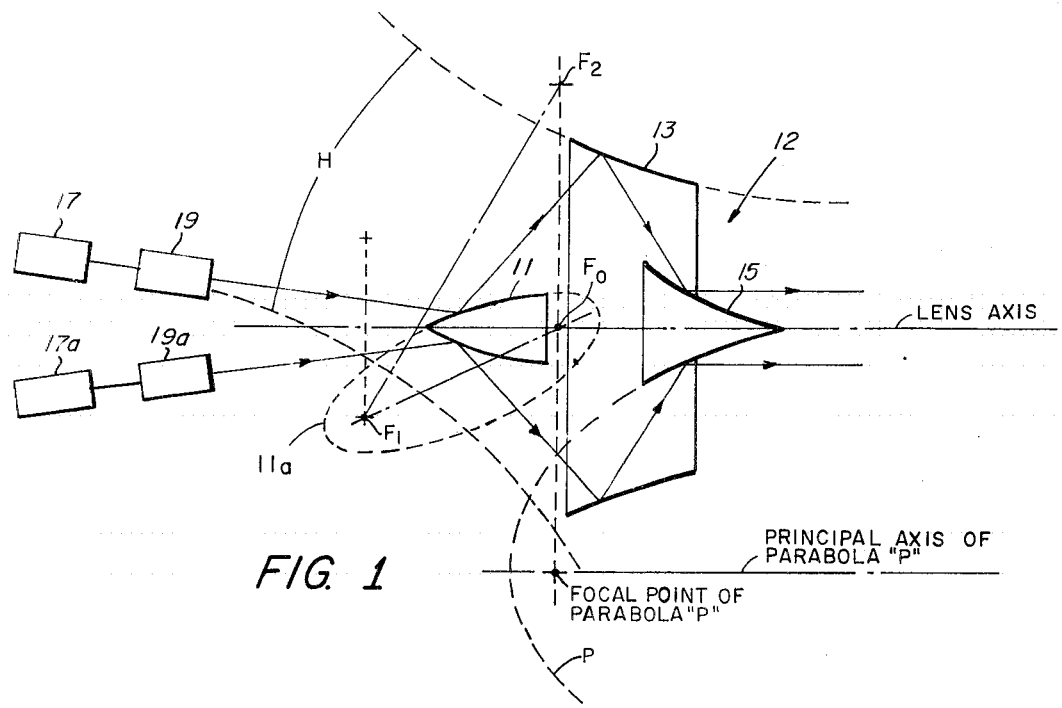
FIG. 1 is a sketch of a meridional section of the lens elements required for a first embodiment of the invention.

Referring now to FIG. 1, it may be seen that a preferred embodiment of this invention includes an entrance mirror 11 and an exit mirror doublet 12, made up of a mirror 13 and a mirror 15, the mirrors cooperating, in a manner to be described, to combine optical energy from more than one source (as lasers 17, 17a) into a collimated beam. Thus, the reflecting surface of the entrance mirror 11 is formed by rotating a portion of an ellipse 11a about a lens axis. This is equivalent to nutating the ellipse 11a about the lens axis so that one focal point, $F_o$, remains on the lens axis and the second focal point, $F_1$, describes a circle about such axis. It follows then, that beams of optical energy (as from the lasers 17, 17a) directed toward focal point $F_o$ through any focusing arrangement 19, 19a (as, for example, the arrangement shown in my copending U. S. application Ser. No. 244,393 entitled "Catoptric Lens Arrangement") are reflected by the entrance mirror 11 as divergent beams with virtual origins on the focal circle described by $F_1$. Such beams are then reflected by the mirror 13 and directed, still as divergent beams, toward the mirror 15. After reflection from the latter the beams are collimated in a composite beam parallel to the principal axis of a parabola P. The reflecting surface of the mirror 13 is formed by rotating a portion of a hyperbola H about the lens axis. This movement is equivalent to nutating the hyperbola H so that its focal points $F_1$ and $F_2$ describe circles about the lens axis as shown. One focal point of the ellipse 11a and one focal point of the hyperbola H, therefore, describe confocal circles. The reflecting surface of the mirror 15 is formed by rotating a portion of a parabola P about the lens axis. The focal point of the parabola P is caused to describe a circle coincident with the focal circle described by $F_2$. Therefore, the mirrors 13 and 15 are confocal. It may now be seen that collimation of the divergent beams entering the exit mirror doublet (remembering that such beams have virtual origins on the focal circle, $F_1$) is accomplished as follows: (a) the divergent beams, after reflection from the mirror 13, are still divergent but have virtual origins on the focal circle, $F_2$; and (b) the still divergent beams (which now may be considered to have originated at points on the focal circle of the mirror 15) are reflected from such mirror parallel to the principal axis of the parabola P.

Figure 2A:
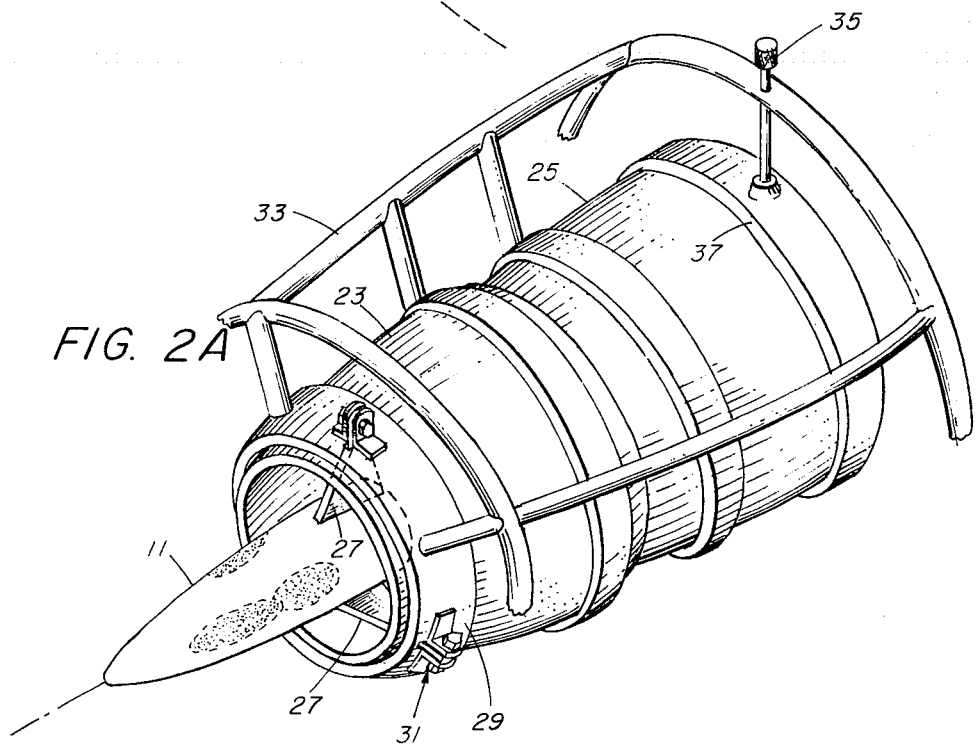
FIG. 2A is an outline drawing showing particularly how the lens elements of the embodiment of FIG. 2 may be assembled.
Figure 2:
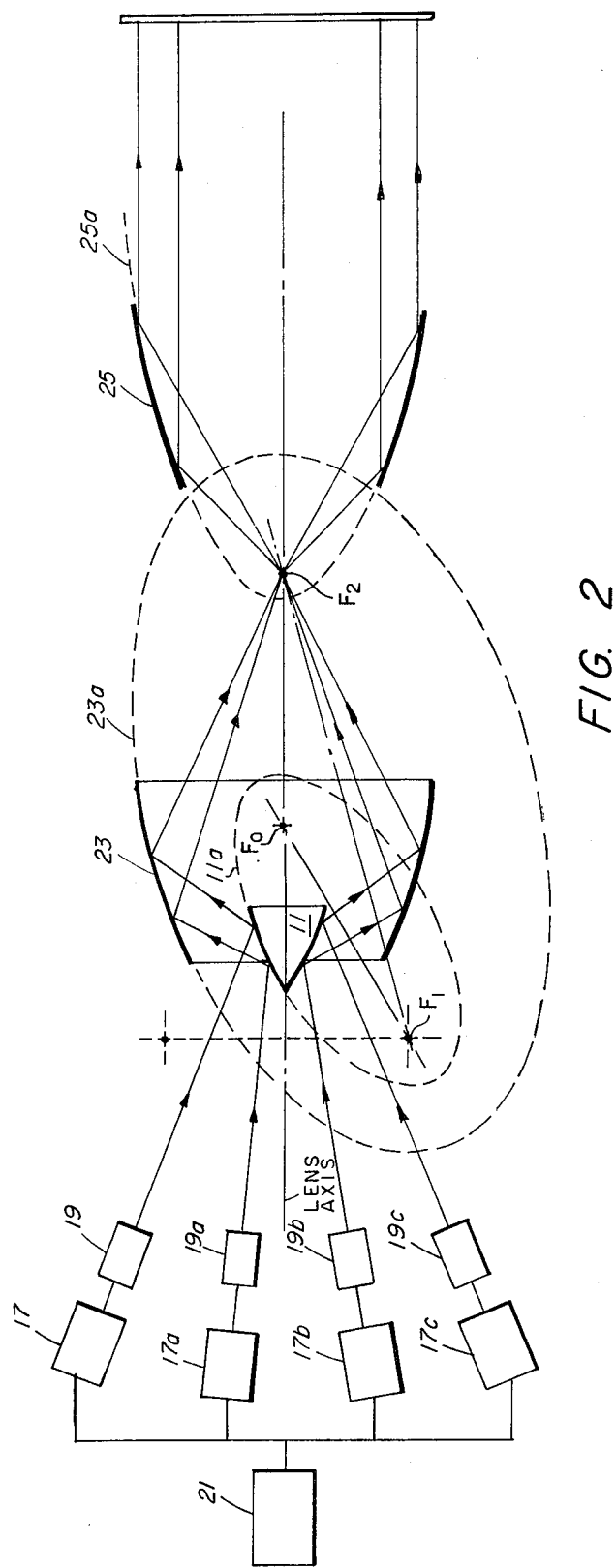
FIG. 2 is a sketch of a meridional section of the lens elements required for a second embodiment of the invention.

Referring now to FIG. 2 it may be seen that the entrance mirror 11 is the same as the entrance mirror 11 of the arrangement shown in FIG. 1. Therefore, beams from lasers 17, 17a, 17b, 17c (again focused toward focal point $F_o$ by focusing arrangements 19, 19a, 19b, 19c) are reflected by the entrance mirror 11 as though from points on the circle described by $F_1$. A secondary mirror 23, formed by rotating a portion of an ellipse 23a about the lens axis, focuses all optical energy reflected from the entrance mirror 11 at a real focal point $F_2$. After passing through such a focal point, the now diverging rays in each beam are collimated in a single hollow beam by a paraboloidal mirror 25. The reflecting surface of the latter is formed by rotating a portion of a parabola 25a (the focal point of such parabola coinciding with focal point $F_2$) about its axis of symmetry. In this connection, it is noted that the lens axis and the axis of symmetry of the parabola 25a may or may not be collinear. It follows, then, that the finally collimated beam out of the illustrated arrangement may be steered by providing means (not shown) for pivoting the paraboloidal mirror 25 about focal point $F_2$.

Referring now to FIG. 2A, it may be seen that the mirror elements making up the catoptric lens arrangement shown in FIG. 2 may easily be secured together in a unitary structure to attain the desired confocality. Thus, a number of spiders 27 (say three) are affixed to the entrance mirror 11 to project through openings in a ring 29 around the outside of the mirror 23. Securing means 31, as for example, screws (not numbered) through posts (not numbered) may be tightened to hold the entrance mirror 11 in a desired position relative to the mirror 25. The ring 29 is attached to a frame 33 which extends around the mirrors 23, 25 as shown. Adjusting posts, as post 35, bearing on a ring 37 may then be moved to hold mirror 25 in its proper relationship to mirror 23. Obviously a similar type of mounting may be used to support the elements in the embodiment shown in FIG. 1.

Having described differing ways in which beams from a number of sources may be combined into a single collimated beam, it will now be apparent that my inventive concepts may be fulfilled with other combinations of confocal catoptric lens arrangements. For example, if it is desired to produce an emergent beam which is focused at a point removed from the illustrated catoptric lens arrangement, the collimating mirror in either embodiment may be replaced by a mirror having a reflective surface corresponding to the surface generated by a portion of an ellipse nutated about the lens axis so that one focal point of the ellipse describes a focal circle coincident with the focal circle of the secondary mirror and the second focal point is a point on the lens axis. It is felt, therefore, that this invention should not be restricted to its disclosed embodiments, but rather should be limited only by the spirit and scope of the appended claims.

What is claimed is:

1. A catoptric lens arrangement for combining convergent beams of optical energy from a plurality of lasers into a composite beam, such arrangement comprising:
    a. means for directing each one of the convergent beams toward a common point;
    b. a first mirror interposed between the plurality of lasers and the common point, such mirror having a convex reflecting surface corresponding to the shape generated by rotating a portion of a first ellipse about a lens axis through the common point, one focal point of such ellipse being coincident with the common point and the conjugate focal point of such ellipse tracing a circle about the lens axis between the common point and the plurality of lasers, each one of the convergent beams to be combined illuminating the convex reflecting surface; and
    c. a second mirror disposed around the lens axis in the path of the optical energy reflected from the first mirror, such second mirror having a reflecting surface corresponding to the shape generated by rotating a portion of a second ellipse about the lens axis, one focal point of such second ellipse tracing a circle coincident with the circle traced by the conjugate focal point of the first ellipse.

2. A catoptric lens arrangement as in claim 1 wherein the conjugate focal point of the second ellipse is a point on the lens axis.

3. A catoptric lens arrangement as in claim 2 having, additionally, a concave paraboloidal mirror disposed in the path of optical energy passed through the conjugate focal point of the second ellipse and confocal with such conjugate focal point.

4. A catoptric lens arrangement for combining convergent beams of optical energy from a plurality of lasers into a composite beam, such arrangement comprising:
   a. means for directing each one of the convergent beams toward a common point;
   b. a first mirror interposed between the plurality of lasers and the common point, such mirror having a convex reflecting surface corresponding to the shape generated by rotating a portion of a first ellipse about a lens axis through the common point, one focal point of such ellipse being coincident with the common point and the conjugate focal point of such ellipse tracing a circle about the lens axis between the common point and the plurality of lasers, each one of the convergent beams to be combined illuminating the convex reflecting surface;
   c. a second mirror disposed around the lens axis in the path of the optical energy reflected from the first mirror, such second mirror having a convex reflecting surface corresponding to the shape generated by rotating a portion of a hyperbola about the lens axis, the transverse axis of such hyperbola being inclined with respect to the lens axis so that the conjugate focal point of such hyperbola is coincident with the conjugate focal point of the first ellipse and the second focal point of such hyperbola traces a second focal circle about the lens axis; and
   d. a third mirror disposed around the lens axis in the path of optical energy reflected from the second mirror, such third mirror having a concave reflecting surface corresponding in shape to the shape generated by rotating a portion of a parabola about the lens axis, such third mirror being confocal with the second focal circle of the second mirror.

* * * * *